United States Patent [19]

Hutcheon

[11] 3,961,172

[45] June 1, 1976

[54] REAL-TIME CROSS-CORRELATION SIGNAL PROCESSOR

[76] Inventor: Robert Stewart Hutcheon, 6548 Covington Way, Goleta, Calif. 93017

[22] Filed: Dec. 5, 1974

[21] Appl. No.: 529,759

Related U.S. Application Data

[63] Continuation-in-part of Ser. No. 421,502, Dec. 3, 1973, abandoned.

[52] U.S. Cl. .................................. 235/181; 179/1 P; 324/77 G; 325/476; 328/167; 328/169

[51] Int. Cl.[2] ....................... G06G 7/19; H04B 1/10

[58] Field of Search ......... 235/181; 179/1 P, 15 FD, 179/15 BF; 325/473–477; 324/77 B; 328/138, 139, 140, 165–175

[56] References Cited

UNITED STATES PATENTS

| | | | |
|---|---|---|---|
| 3,447,095 | 5/1969 | McMillan | 328/168 |
| 3,605,018 | 9/1971 | Coviello | 325/473 |
| 3,636,446 | 1/1972 | Genter et al. | 328/138 |
| 3,713,034 | 1/1973 | Schwartz | 328/168 |
| 3,771,063 | 11/1973 | Barrett | 307/232 |
| 3,784,749 | 1/1974 | Shigeyama et al. | 179/1 P |
| 3,835,400 | 9/1974 | Briscoe | 328/168 |

*Primary Examiner*—Felix D. Gruber
*Attorney, Agent, or Firm*—Harris, Kern, Wallen & Tinsley

[57] ABSTRACT

Apparatus for improving the signal to noise ratio in an electrical signal. A signal enhancement processor operating in real time and selecting signals based upon the similarity of the incoming signal to a locally generated reference and which does not require that signals be filterable in the frequency domain, that external referencc signals be supplied, or that signal amplitude criteria be employed. A system for providing input signal attenuation or rejection as a function of the frequency or phase of the input signal, with attenuation at a maximum for an undesired signal and at a minimum for a desired signal.

40 Claims, 17 Drawing Figures

REAL-TIME CROSS-CORRELATION SIGNAL PROCESSOR

This application is a continuation-in-part of copending application Ser. No. 421,502, filed Dec. 3, 1973, and now abandoned, entitled Real-Time Cross-Correlation Signal Processor.

This invention relates to the processing of electrical signals such that signals of a desired type are accepted while others are discriminated against or rejected. The circuit process may be achieved by either frequency or time domain methods (the two form a Fourier transform pair). In addition, analogous processes exist in terms of phase and frequency processing and both are described. In all of the following the input signal is considered to be a narrow band signal, that is, the input signal bandwidth is considered to be small with respect to the input signal frequency. While the effects of circuit time delays are not specifically discussed herein, it is assumed that all signal paths are time delay equalized; e.g., when signals are summed, the total time delays in each of the signal paths are equal. Similarly, when a control signal is used to regulate the operation of an attenuator, the time delays are presumed to be such that regulation of the attenuator is made simultaneously with the instantaneous phase or frequency of the input signal.

The signal processing system of the present invention provides for the selection of signals based upon the degree of similarity to a locally generated reference, typically frequency or phase or both. Since a reference is used, either explicit as in the case of digital data transmission or implicit as in the case of antenna beamwidth enhancement, the system is referred to as a cross-correlation system. The reference frequency or phase may be eplicit in the sense that a signal or signal analog is generated which designates the instantaneous frequency or phase of a desired signal, or the reference may be implicit in the sense that as a result of circuit configuration only a signal having a particular frequency or phase can be accepted.

The system treats desired signals in a linear manner and operates in real time in the sense that all signal comparisons or decisions or actions for accepting or rejecting signals are carried out within a time commensurate with the rise time implied by the input signal bandwidth.

In the time domain versions of the system a signal-to-noise-ratio (S/N) processor is used in which signal bandwidth is increased (multiplied) in accordance with the instantaneous degree of similarity of the input signal frequency or phase to that of the reference. After filtering to a bandwidth commensurate with that of a desired signal, the resultant is a measure of the instantaneous S/N of the input signal. This measure may be used directly (especially where signal amplitude information is not important), or it may be used to regulate the instantaneous amplitude of the input signal such that an output is provided which is an improved S/N version of the input signal.

In the frequency domain versions of the system the input signal bandwidth is increased by means of frequency (phase) multiplication in accordance with the instantaneous degree of similarity of the input signal frequency or phase to the reference. Frequency processing of the frequency domain version of the system is achieved by use of a single frequency multiplier having a relatively large multiplication factor and resolving desired signals (after multiplication) by means of a bandpass filter centered at the multiplied value of the desired signal frequency, and having a bandwidth commensurate with the input signal bandwidth.

Phase processing of the frequency domain version of the system is achieved by use of a frequency multiplier comprising a plurality of frequency multiplier stages each having a relatively small multiplication factor. The individual frequency multiplier stages each provide a frequency multiplier output and are arranged such that all frequency multiplier outputs are at the same frequency and amplitude but have phases which are uniformly distributed at a fixed multiple of the instantaneous relative phase between the input signal and the reference. Desired signals are resolved by summing the outputs of the multiplier such that desired signals are maximized while other signals are discriminated against or rejected. Both frequency domain processing versions of the system may be arranged to retain or discard signal amplitude information.

The undesired signal may take many forms, including thermal or white noise, adjacent channel interference, static, impulsive noise such as ignition noise, radar clutter and deliberate interference or jamming. For optimum results, the input signal should be conditioned such that unessential frequency variations or other modulations which may increase signal bandwidth are reduced or eliminated, and the resultant signal bandpass filtered to a bandwidth commensurate with the information to be extracted from the desired signal plus any residue due to unessential modulations. Note that in the following, any undesired signal is considered to be noise.

Other advantages, features and results will more fully appear in the course of the following description. The drawings merely show and the description merely describes preferred embodiments of the present invention which I give in the way of illustration or example.

DESCRIPTION OF THE PREFERRED EMBODIMENTS

Figure 1:
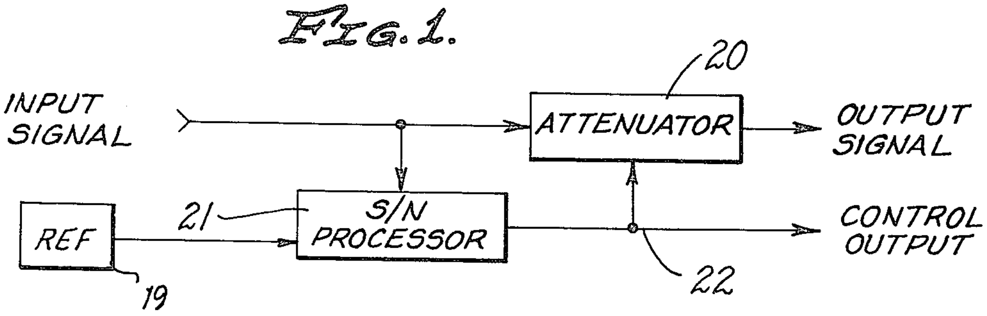
FIG. 1 is a block diagram of an electrical circuit incorporating the basic system.

The basic time domain version of the system is illustrated in FIG. 1. Input signals are applied to an electrically variable attenuator 20 and to a signal-to-noise-ratio (S/N) processor 21. The S/N processor 21 also accepts an input from a reference source 19 which defines the acceptance criteria for a desired signal in terms of frequency, phase, or both. The output of the S/N processor 21 is such that with no desired signal present, the control output at 22 is minimum. The control output increases when a desired signal is present, and asymtotically approaches a maximum value (assumed to be unity here) for moderate to large values of S/N. This control output is used to control the attenuator 20 such that attenuation is minimum (nominally zero) for unity output from the S/N processor and maximum when the S/N processor output is minimum. The internal operation of the S/N processor is performed at a bandwidth which is wide with respect to the input signal bandwidth. The rise time of the attenuation function (including the effects of both the attenuator and the control output of the S/N processor) is commensurate with the rise time implied by the input signal bandwidth. Thus the attenuator operation is regulated in accordance with the instantaneous degree of simularity between the actual input signal and the desired signal as defined by the reference.

FREQUENCY PROCESSING

Figure 2:
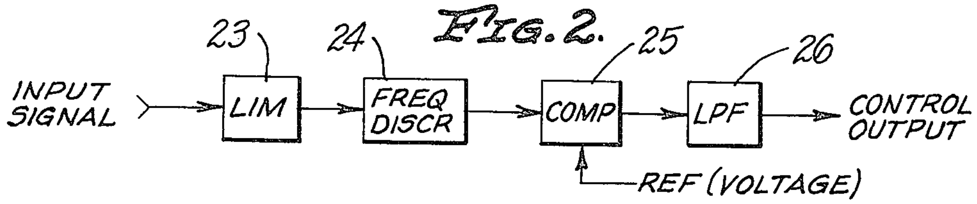
FIGS. 2 and 3 are block diagrams illustrating two forms of the processor of the system of FIG. 1.

A frequency processing embodiment of the S/N processor 21 is shown in FIG. 2. The input signal is first applied to a limiter 23 to remove amplitude variations (undesired harmonics are presumed to be filtered output). The amplitude limited signal is then applied to a frequency discriminator 24 which provides an output amplitude which is a direct measure of the input signal frequency. This output is then applied to a comparitor 25 which provides an output only when the frequency discriminator output matches the reference voltage (REF). The comparitor output is low pass filtered at 26 to a band which is commensurate with the modulation components of desired signals. Note that in passing through the limiter, the signal bandwidth is increased, and that the frequency discriminator does not contain filters which would restrict or limit the bandwidth of the baseband output. In addition, the rise time of the comparitor is very short with respect to the input signal rise time. It is a very important element of the S/N processor design that the circuit be arranged such that, for undesired signals, the comparitor produces outputs at the highest possible rate and that the duty ratio of its output be a minimum while assuring that the reverse is true when the input signal is of the desired type.

Operation of the circuit of FIG. 2 may be understood by considering the differences in the output for various S/N conditions. Assume that the desired signal has a frequency equal to the band center of the input signal channel, and that the REF voltage applied to the comparitor is at the corresponding amplitude. In the absence of desired signal input (thermal noise only) the discriminator output varies according to the instantaneous frequency of the input noise. On occasion this output will briefly match the REF value and a comparitor output will be produced. However, from well known characteristics of noise, these comparitor outputs will be such that several are produced during a time equal to input signal rise time, but each of these will be extremely short in duration. As a result, the filter output is low in amplitude.

For cases where the input signal corresponds to a desired signal only, the discriminator output is at the same amplitude as the REF and the comparitor output is unity (full continuous output). For this steady condition, no discrimination occurs at the filter and control output is also unity. Note that these circumstances are independent of desired signal amplitude since amplitude variations were removed by the limiter.

If the input signal consisted of a desired signal plus a minute amount of noise, circumstances would be essentially the same. However, as the noise power is increased, the instantaneous frequency exhibited by the composite input signal departs from the desired value, and the comparitor output reflects these conditions. At first, the departure from frequency match occurs infrequently and very briefly, and the filter discriminates against the tendency for the comparitor output to decrease. As the noise power is further increased, the frequency and duration of the out of match condition also increases, and the output from the filter begins to decrease substantially. As this process of increasing noise power input continues, a point is reached where signal power is a very small portion of the total input signal power, and the filter output is essentially indistinguishable from the noise only input condition.

From the preceding, it can be seen that the filter output is a measure of the input S/N in terms of the desired signal. Also, from FIG. 1, when the filter output is used to control the attenuator 20, the output signal is modified in accordance with the instantaneous S/N of the input signal, and thus exhibits a higher S/N.

Phase Processing

Figure 3:
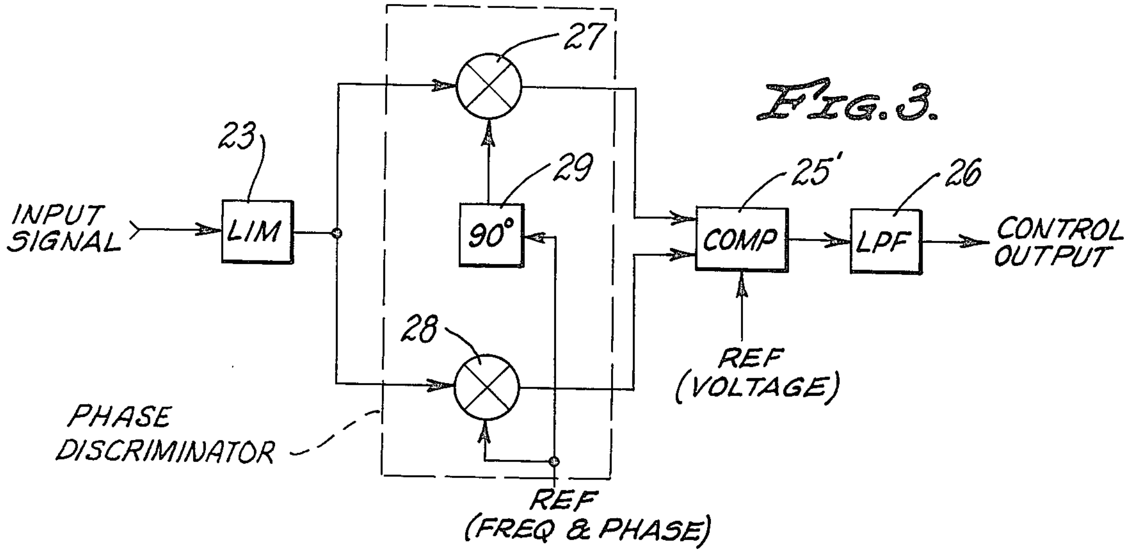

The phase processing embodiment is shown in FIG. 3. The input signal is first limited to remove amplitude variations, and the resultant is applied to a phase discriminator consisting of a pair of product detectors 27, 28 (e.g., doubly balanced mixers). A second input to the phase discriminator is a reference signal which represents the frequency of the desired signal. The reference signal to one of the product detectors is shifted in phase by 90° at 29. The product detector outputs are the sine and cosine functions of the instantaneous input signal phase with respect to the product detector REF signal. These product detector outputs are applied to a comparitor 25' along with a voltage reference (REF).

The comparitor 25' performs a function much like that of the comparitor 25 in the frequency processing embodiment of FIG. 2, except that in this case it is the input signal phase which is being compared against the REF voltage. Amplitude information into the comparitor denotes signal phase which is compared against the REF voltage. When the input signal phase corresponds to (matches) the REF value, the comparitor provides an output. Both sine and cosine inputs are provided since (in general) there are two values of signal phase which cause the same output from a product detector.

This ambiguity is removed by using both sine and cosine functions. The output of the comparitor is low pass filtered at 26 to form the control output.

Operation of the phase processor is similar to that of the frequency processor. For a noise only input signal, the phase changes rapidly, and the output of the comparitor is a sequence of randomly spaced pulses due to the brief intervals of phase match condition. The time duration of these pulses is short with respect to the reciprocal bandwidth of the low pass filter, thus the filter output amplitude is small (low).

For an input signal which is a phase match, the comparitor output is at a continuous maximum value (unity). This resultant passes through the filter without discrimination and the control output amplitude is also unity. If noise is added to the input signal, the phase match condition becomes progressively degraded as the S/N degrades. When the noise input power is sufficiently large with respect to the signal power (desired signal power), the filter output becomes indistinguishable from the noise only case.

As in the frequency processing case, the filter output for phase processing is a measure of the S/N of the input signal. Thus when it is used to control the attenuator 20 of FIG. 1, the output signal is modified in accordance with the instantaneous S/N of the input signal, and the result is a S/N improved version of the desired signal.

COMBINED PHASE-FREQUENCY PROCESSING

The phase and frequency processes described above provide an effective improvement in S/N for desired signal inputs at the output signal, and also a measure of the input S/N in terms of the desired signal type at the control output. However, it should be recognized that the frequency process is characterized by a relative lack of precision, and is without ambiguity. The phase process is relatively precise, but is ambiguous. That is, the frequency process will tend to indicate a match at larger frequency differences (between) input signal and desired signal) than the phase process. However, the phase process will erroneously indicate a match condition for conditions where the frequency error is relatively large.

The phase and frequency processors may be combined so that the advantages of both are obtained. Two practical techniques for this are: 1) to add the phase and frequency processed outputs from the low pass filters to form a composite; or preferably, 2) to multiply the outputs from the phase and frequency low pass filters to form a combined control output. For the second version, full output signal amplitude can only be obtained while the input signal exhibits both the correct phase and frequency. This is a considerable improvement over either process by itself.

The preceding explanation of processor operation is based on an assumed two-state output from the comparitor; that is, the comparitor output is unity for match conditions and zero for all other conditions. This operation may be approached by real circuits, but may not be realized in full. Thus the match condition has a tolerance or limit band associated with it. In practical cases, the width of this tolerance band (in phase or frequency) and the manner in which the comparitor output goes from zero to one and back to zero becomes a circuit design variable which the circuit designer can use to advantage to optimize desired signal acceptance.

For phase coded signals, the control output may be arranged to be used as a direct measure of the probable state of the input signal.

The phase processing embodiment may be extended by dividing 360° into $n$ parts and using $n$ comparitors, each of which has a $360/n$ tolerance band in degrees. Each comparitor would be followed by its own low pass filter. The resulting outputs can then be used (combined) in various manners to provide improved operation for specific signal types. For example, they may be combined by an analog equivalent of the logical OR function (i.e., the combined output is always equal to the largest input). It will be recognized that the desired signal for this case is one which may have any phase, but the phase must not change too rapidly. Note that this is similar to combined phase and frequency processing.

The control output of the phase, frequency, or combined phase/frequency processor is a useful estimate of the S/N of the input signal. Thus a phase spectrum (360° in width) or a frequency spectrum (input signal bandwidth) may be formed by dividing the total range into a set of contiguous increments, as described above. The individual elements of this set may then be modified such that the amplitude of the sum of the inputs is constant (e.g., unity). The result is a probability density function of the frequency or phase of the input signal channel.

The reference inputs used in the phase and frequency processors are not restricted to static values, and may be functions of time. In addition, they may be functions of time not only in the sense of a changing frequency or phase, but also in the sense of on or off. That is, they may be time gated functions. This leads to the capability for very complex processing functions. In addition, it leads to a capability (or basis for) signal encryption in that the references may become a function of input signal past history. This would provide time simultaneous methods for transmission of both intelligence and signal decoding information. As a corrolary to this, the invention provides basis for improved signal modulations such that information may be encoded in denser form (bandwidth compression).

FREQUENCY DOMAIN EQUIVALENT PROCESS

The processes described above are time domain processes, and they have exact equivalences in terms of frequency domain processes. The time domain versions consist of time gating and filtering of input signal components. These time gating functions (comparitor outputs) may be decomposed by Fourier methods to show a frequency or phase spectrum which represents the time gating function. These spectral components of the time gating function may be generated by means of fixed frequency multipliers (not to be confused with a mixer used for fixed frequency translation of signals) driven by the input signal. When combined at the correct amplitudes and phases as determined by the Fourier decomposition, the resultant will be the same as the output signal of FIG. 1. It should be noted that the frequency multipliers used for this application should not modify the amplitude information in any non-linear manner. Only the phase or frequency information is multiplied.

ANTENNA BEAMWIDTH ENHANCEMENT EMBODIMENT

Figure 4:
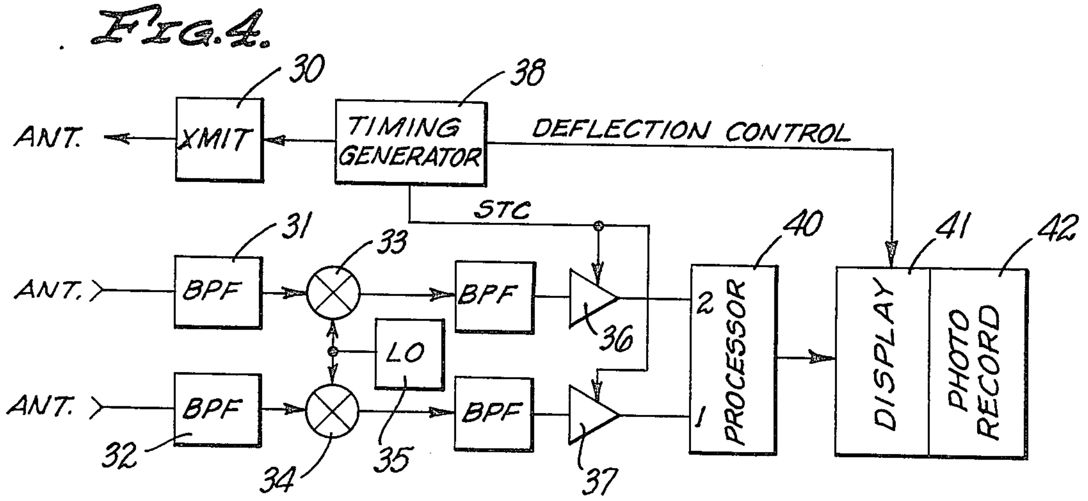
FIG. 4 is a block diagram of an airborne mapping radar incorporating the processing system of the present invention.

FIG. 4 shows an application of the processing system to beamwidth enhancement for the case of an airborne mapping radar. An airborne pulse radar transmitter 30 feeds an antenna which is arranged to illuminate the ground with a radiation pattern which is narrow in azimuthal beamwidth, and which has moderate to wide elevational beamwidth. Backscattered energy from the terrain and objects thereon is received by an antenna of similar radiation pattern, but which has two feed points which are displaced in terms of their azimuthal phase centers. The two signals from the receive antenna are bandpass filtered at 31, 32, heterodyned at 33, 34 to a convenient intermediate frequency using a local oscillator 35, and STC-amplified at 36, 37 using sensitivity time control from the timing generator 38. The resultant signals are then applied to the processor 40. The processor output signal may be displayed at 41 or photo-recorded at 42 as desired. The processor 40 using the system of the invention provides for enhanced target detectability and angular resolution.

Figure 5:
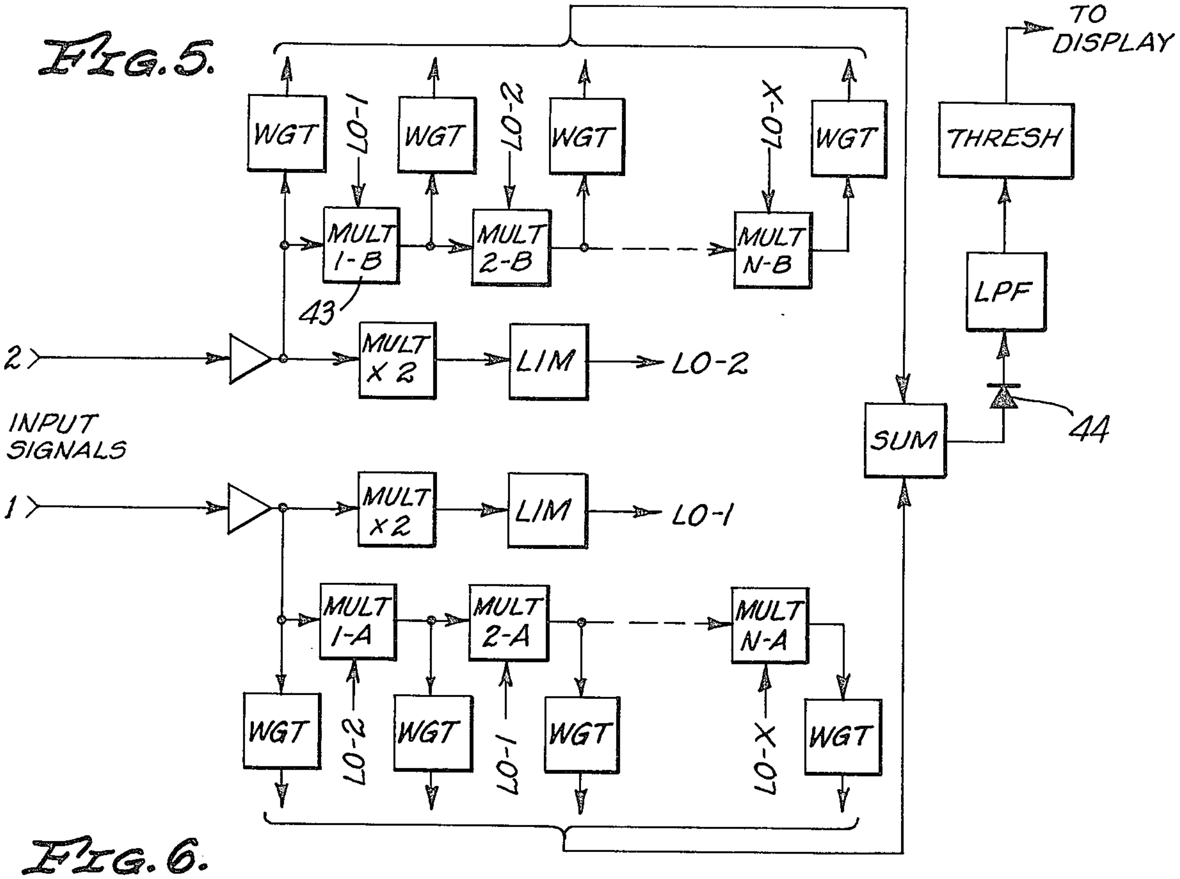
FIG. 5 is a block diagram of a preferred embodiment for the processor of FIG. 4.
Figure 6:
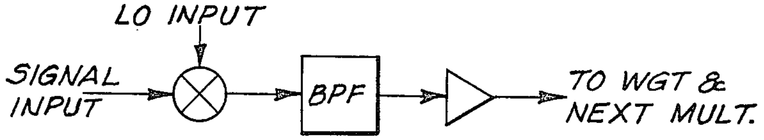
FIG. 6 is a diagram of a typical multiplier for the processor of FIG. 5.

A preferred embodiment of the processor 40 is shown in FIG. 5. The input signals are individually amplified, frequency multiplied by a factor of 2, and amplitude limited. The two resultants are then used as local oscillators LO-1 and LO-2. The bandpass limited and amplified inputs are also applied to the first stages of a pair of cascaded frequency multipliers, and to a summing circuit. A typical frequency multiplier stage 43 is shown in FIG. 6 and consists of a mixer, bandpass filter, and amplifier as required to restore circuit losses. The mixer used should preferably be of a type for which input signals are suppressed at the output, e.g., a doubly balanced mixer. Successive frequency multiplier stages alternate in their use of LO-1 and LO-2; the first frequency multiplier stage for input 1 uses LO-2, and the first, frequency multiplier stage for input 2 uses LO-1. The symbol LO-X is used for the input to the Nth multiplier indicating either LO-1 or LO-2 as the input, depending on whether an odd or even number of multipliers is used. The output of each frequency multiplier stage is applied to the next frequency multiplier stage and is also amplitude weighted (WGT) and applied to the summing circuit. This proccess is continued for as many frequency multiplier stages as desired, the number of frequency multiplier stages being chosen such that the desired degree of beamwidth enhancement is obtained. The single summed output from the two sets of frequency multiplier stages is then detected at 44, low pass filtered to a bandwidth commensurate with the transmitted pulse width, and the resultant becomes the processor output. Thresholding may be used to eliminate background noise.

To appreciate the significance of FIGS. 5 and 6, it is important to distinguish the difference between frequency multiplier as used herein and more common multiplier used as a mixer. In typical applications a mixer is used to change the frequency of a signal by some fixed quantity. In contrast, the primary function of the frequency multipliers of FIGS. 5 and 6 is to change the signal frequency and phase by an amount which is related to the difference between the actual input frequency and phase, and the reference frequency and phase. In FIG. 5, the (implied) reference is the mean frequency and phase of the two inputs. Since in this case the input signal frequencies are identical, only the phase is important. Thus if the two input signals are represented by $A(t)\cos[\omega(t) + \phi]$ and $A(t)\cos[\omega(t) - \phi]$ respectively, then LO-1 and LO-2 are represented by $A_1\cos[2\omega(t) + 2\phi]$ and $A_1\cos[2\omega(t) - 2\phi]$ respectively. The amplitude coefficients are equal due to the use of the amplitude limiters shown in FIG. 5. The output of frequency multiplier stage 1-A is thus input signal 1 multiplied by LO-2 or $A_1A_2A(t)\cos[\omega(t) - 3\phi]$ where $A_2$ represents the net gain provided by the circuit of FIG. 6. Ignoring the amplitude coefficients, the output of frequency multiplier stage 1-B is $\cos[\omega(t) + 3\phi]$, the outputs of multiplier Stage 2-A and 2-B are $\cos[\omega(t) + 5\phi]$ and $\cos[\omega(t) - 5\phi]$ and so on to multiplier stages N-A and N-B which have outputs $\cos[\omega(t) \pm (2N+1)\phi]$ and $\cos[\omega(t) \pm (2N+1)\phi]$ respectively. The composite set of multiplier outputs thus represents a spectrum of signals having the same amplitude and frequency (in general varying) and uniformly distributed in phase at a spacing of $2\phi$, the instantaneous relative phase between the two inputs.

The weighting factors are determind primarily on the basis of the actual application involved. The effect of using weighting factors (other than unity) is to modify the lobe width and sidelobe response levels of the synthesized response function. For uniform weighting (all summed functions of equal amplitude), the synthesized response function has first sidelobes at approximately -13dB relative to the main lobe maximum, with all sidelobes being in essential accord with the $(\sin x)/x$ function. Sidelobe reduction may be achieved by progressively reducing the amplitude of the summed contributions of the higher valued frequency multiplier stage outputs. The reduced sidelobe amplitudes are obtained at the expense of some broadening of the main lobe response.

Important design factors are determined as follows: The phase center separation of the two receive antenna ports is selected such that a phase difference of 360° preferably occurs at an azimuthal angle which has a null in the basic antenna response, and preferably the lowest order azimuthal null achievable for the basic antenna used.

Since both processor inputs are at the same frequency (but variable phase), all frequency multiplier stage outputs are also at the same frequency. The composite set of summed signals consists of 2N+2 outputs, all at the same frequency, but with phase differences which are periodic in the phase difference of the two inputs. For input signal phase differences of 180° or less, and uniform weighting of thr frequency multiplier stage outputs, nulls in the summed frequency multiplier stage output occur for input signal phase differences of 360k/(2N+2) where K is a non-zero integer, and N is the number of frequency multiplier stages used for one input. The processor thus forms an effective (or synthetic) angle response function which has nulls at ± 1/(2N+2) of the angular extent which causes a 360° phase difference between the two input signals. The half-power lobe width of the processor response is slightly over one-half of this angular size. As in the case of phased array antennas, the sidelobe response levels may be reduced (at the cost of slightly wider main lobe response width) by progressive reductions to the amplitude of multiplied components.

Operation of the processor of FIG 5 is as follows: For point targets at high S/N, the proccessor provides full similar, but which have carrier frequencies outside of the selected doppler frequency range will not reside in any post multiplication filter and will be rejected. Similarly, signals which are unstable or modulated in frequency (phase) will be spectrally broadened in accordance with the amount of frequency change and the multiplication factor involved. For large multiplication factors, these signals are subject to significant rejection. For noise only input conditions, the multiplier output bandwidth is of the order of the multiplication factor times the processor input bandwidth. Thus the output from any one output channel is reduced by a factor equal to the reciprocal of the multiplication factor involved If a desired signal is added to the noise input, the output from the corresponding output channel will rise, full output being obtained at moderate to high S/N. The ability of the processor to suppress output for no signal conditions, and to provide increased output based on the instantaneous relative level of signal to noise power provides for enhanced signal detection capability at low values of S/N.

Figure 10:
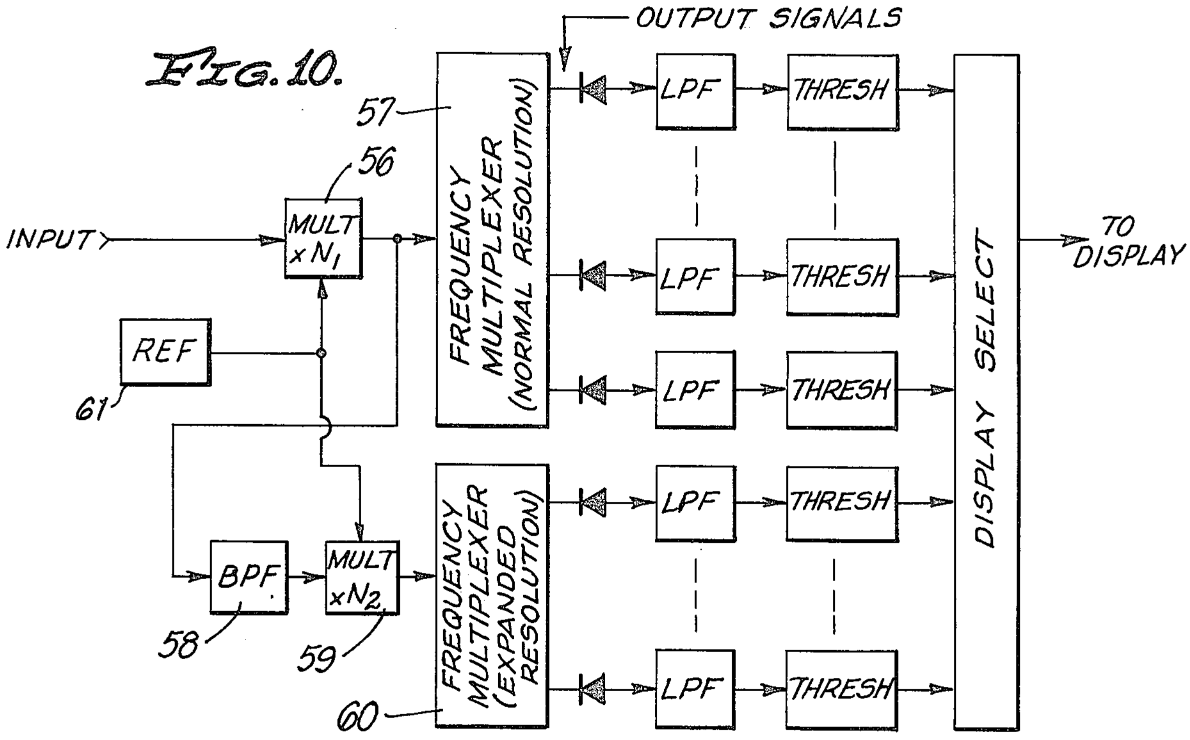
FIG. 10 is a block diagram of a processor for the system of FIG. 9.
Figure 11:
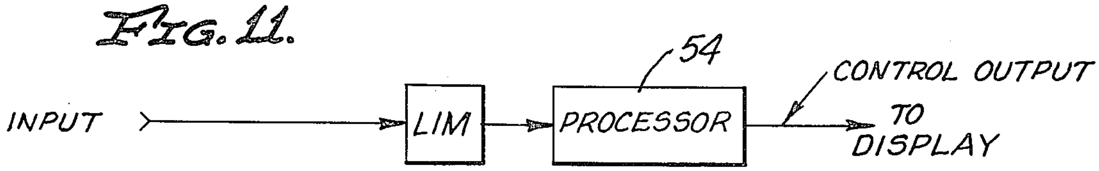
FIG. 11 is a block diagram of an alternative form for the processor of FIG. 10.

For some radar practices, the relative amplitude of the target backscatter is of secondary importance. For these circumstances the processor design may be simplified as shown in FIG. 11. Here the processor 54 of FIG. 10 is preceded by an amplitude limiter which serves to reduce the dynamic range over which the processor circuits function. Operation is highly similar to that of FIG. 10 except that for moderate to hish S/N circumstances, the channel containing the desired signal has essentially constant output.

Figure 12:
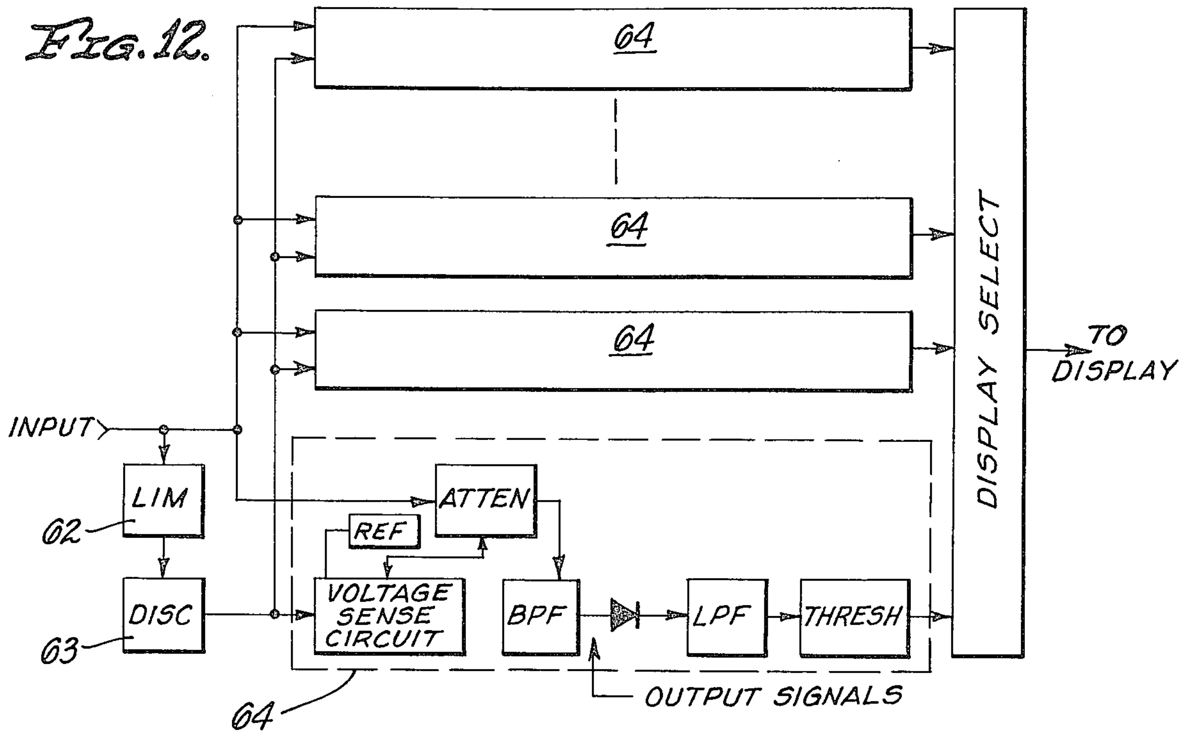
FIG. 12 is a block diagram of a time domain processor similar to that of FIG. 10.

The processors shown in FIGS. 10 and 11 are frequency domain processes. An analogous time domain process may be used as shown in FIG. 12. The processor input signal is divided into two paths with one being applied to a limiter 62 and discriminator 63. The discriminator output voltage represents the frequency of the input at each instant of time. The discriminator output is applied to the voltage sensing circuit of each of a group of frequency units 64. Each frequency unit 64 also includes an independent reference source (REF) which is applied to the voltage sensing circuit. The voltage sensing circuits comprise the comparitor, low pass filter portion of the circuit shown in FIG. 2 and operate in the same manner.

The voltage sensing circuits operate such that the corresponding attenuator is caused to have minimum attenuation when the input signal is within a specified narrow range of frequencies (discriminator output voltage), and maximum attenuation elsewhere. The voltage sensing circuits are arranged to operate over a contiguous range of frequencies which include all doppler frequencies of interest. The individual frequency range of each voltage sensing circuit is adjusted to equal the desired doppler resolution.

The output of each attenuator is bandpass filtered, detected, low pass filtered and thresholded to provide desired detection statistics. These outputs correspond to the detected and thresholded outputs of FIG. 10.

Figure 13:
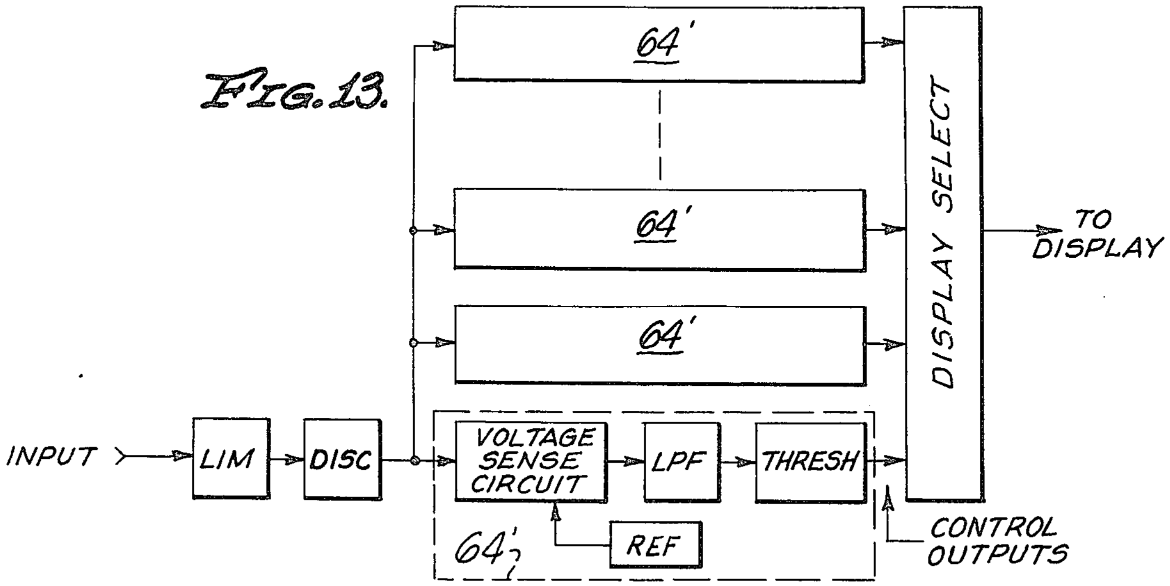
FIG. 13 is a block diagram of a simplified form of the processor of FIG. 12.

If signal amplitude information is not required, the circuit of FIG. 12 can be simplified to that of FIG. 13, Here the signal and attenuator paths have been eliminated in frequency units 64'. Instead, the outputs from the voltage sensing circuits are low pass filtered to a bandwidth commensurate with the radar pulsewidth, and the resultants thresholded. These outputs correspond to the outputs of FIG. 11.

The embodiments shown in FIGS. 10 through 13 will be recognized as frequency processing versions of the invention.

DIGITAL DATA TRANSMISSION EMBODIMENT

Figure 14:
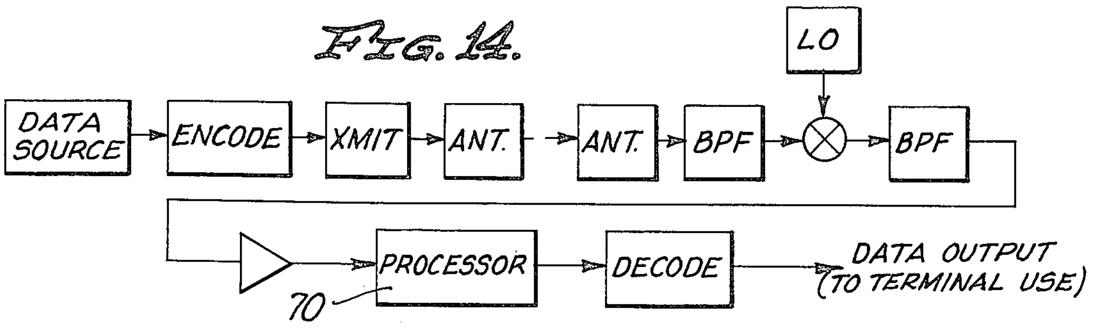
FIG. 14 is a block diagram of a digital data transmission system incorporating the signal processing system of the invention.

FIG. 14 shows an application of the processing system to the transmission of digital data. The output of a digital data source is encoded, used to modulate a transmitter, and radiated by an antenna. A portion of the radiated energy is intercepted by a receiving antenna, bandpass filtered, heterodyned to a convenient intermediate frequency, bandpass filtered, amplified and applied to the processor 70. The processor output is a binary data stream which is decoded to provide proper data format. For this example, the use of a simple, self-clocking, biphase data waveform is assumed. For this class of waveform, the signal amplitude does not convey information. Information is conveyed by signal phase which has two states which are at a relative phase of 180°. Phase state changes at regular intervals provide clock timing, while the presence or absence of a phase state change between clock events denotes the presence of a one or zero.

Figure 15:
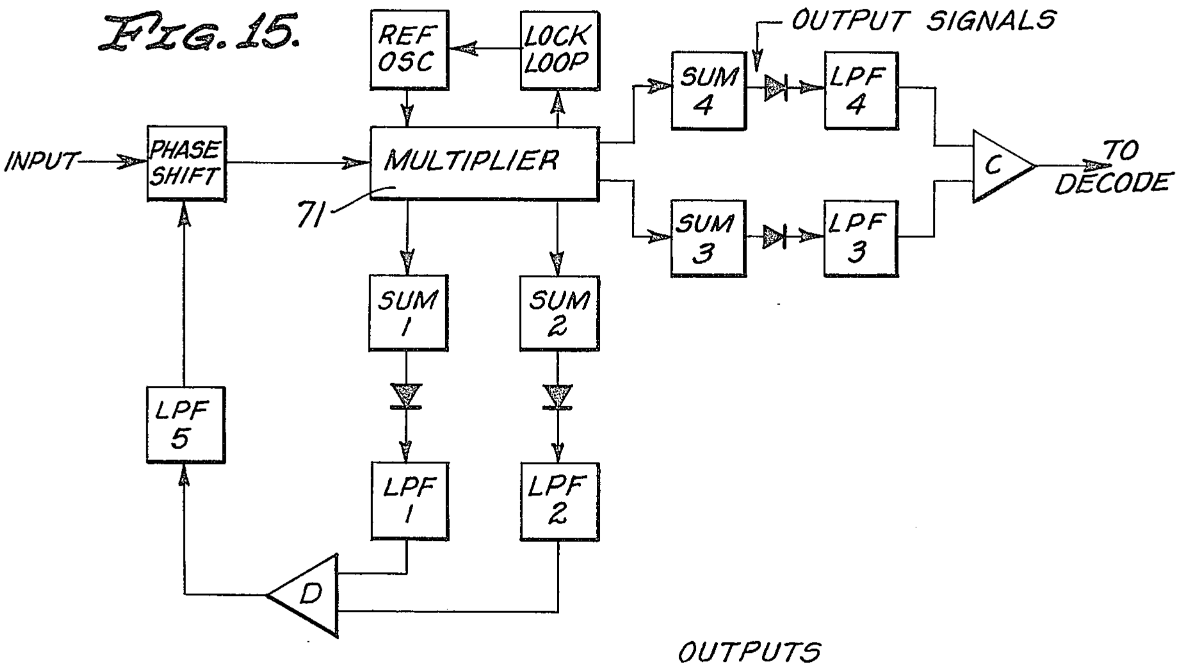
FIG. 15 is a block diagram of a processor for the system of FIG. 14.

The processor 70 is shown in more detail in FIG. 15. The input signal is first applied to a voltage controlled phase shift device which is regulated such that (on average) the phase shifted output is always in or out of phase with the reference oscillator. The reference oscillator is phase locked to the processor input signal by means of an output from the multiplier 71. The phase shifted signal is then applied to the multiplier which provides a plurality of outputs, all of which are at the same frequency but which differ in phase by integral multiples of the phase difference between the multiplier input and the reference oscillator. The multiplier 71 is shown in more detail in FIG. 16, described hereinbelow.

A summing device 4 receives all multiplier outputs and sums them at unchanged phase. The resultant is a maximum only for those conditions where the multiplier input is very nearly in phase with the reference oscillator. Another summing device 3 receives all multiplier outputs and sums them at unchanged phase except that alternate inputs are inverted in phase (180°). The resultant is a maximum only for those conditions where the multiplier input is very nearly outphased (180°) with the reference oscillator.

The outputs of sum 4 and sum 3 are detected, lowpass filtered to a bandwidth commensurate with the data rate, and applied to a voltage comparitor. The comparitor output is high or low depending upon whether the output of filter 4 is larger or smaller than that of filter 3. The comparitor output thus provides proper clock and data outputs for operation of the decode circuit. As a result of the processor function, data error rates are improved for low S/N conditions. In addition, although a biphase signaling waveform was assumed, the process can be directly extended to "n-phase" by providing additional summing elements which combine the multiplier outputs with appropriate phase weightings.

Summing devices 1 and 2 receive alternate outputs from the multiplier. Thus the phase difference between adjacent multiplier outputs is twice that of the difference between the multiplier input and the reference oscillator. Sum 1 and sum 2 provide linear, progressive phase weightings of opposite sense to the multiplier outputs used such that the summed outputs depart output amplitude only when the target is at the center of the antenna response function. At angles off center, the processor tends to reject target responses. For continuous targets at high S/N, the processor provides output to the extent that targets at antenna center have prominence. Other target responses are suppressed. For low to moderate S/N, target responses are provided to the extent that they are at antenna center, and to the extent that S/N is not too low. The processor tends to suppress outputs due to noise only, but provides improved detectability at low S/N, and improved angular resolution.

By inserting a phase shift element in either input signal path, the angular response of the processor may be steered across the response pattern of the basic antenna. Also, by means of auxilliary phase shifters at the individual multiplier outputs, a similar effect may be obtained. By power splitting and using one or more sets of phase shifters, a multiplicity of processor response functions may be obtained at selected angles of signal arrival. If all angles of signal arrival are desired, a multiple beam forming network of the type used in antenna array practice may be employed.

Figure 7:
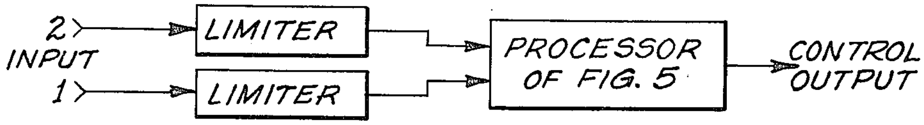
FIG. 7 is a block diagram illustrating an alternative form for the processor of FIG. 5.

For some applications, the relative amplitude of the backscattered energy is of secondary importance. For these circumstances, the processor design may be simplified as shown in FIG. 7. Here the processor of FIG. 5 is preceded by a pair of amplitude limiters which serve to reduce the dynamic range over which the processor circuits function. The limiters of FIG. 5 following the frequency multipliers may be omitted.

Figure 8:
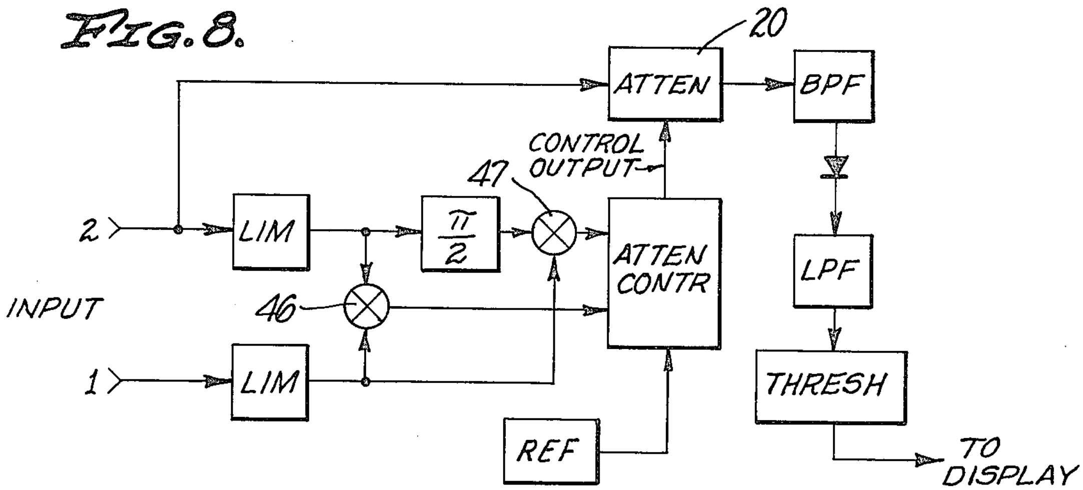
FIG. 8 is a diagram of a time domain alternative for the processor of FIG. 5.

The processors of FIGS. 5 and 7 use frequency domain processes. An analogous time domain process may be used as shown in FIG. 8. Here the processor inputs are applied to amplitude limiters and the resultants are applied to a phase discriminator consisting of a pair of product detectors 46, 47 fed in phase quadrature. The combination of outputs of the phase discriminator unambiguously represents the relative phase of the two processor inputs at each instant of time. The phase discriminator outputs are applied to an attenuator control circuit which contains voltage sensing circuits which in turn regulate the operation of a voltage controlled attenuator 20. One of the processor input signals is also applied to this attenuator.

The voltage sensing circuits of the attenuator control operate such that the attenuator is caused to have minimum attenuation when the relative phase of the two processor inputs are within a narrow range of a specific relative phase, and maximum elsewhere. The range of relative phase for minimum attenuation is adjusted so that the desired angular resolution is obtained.

The output of the attenuator is bandpass filtered, detected, and thresholded to provide desired detection statistics. The output of FIG. 8 corresponds to the output of FIG. 5 and will be recognized as a phase processing version of the invention.

RADAR DETECTION ENHANCEMENT EMBODIMENT

Figure 9:
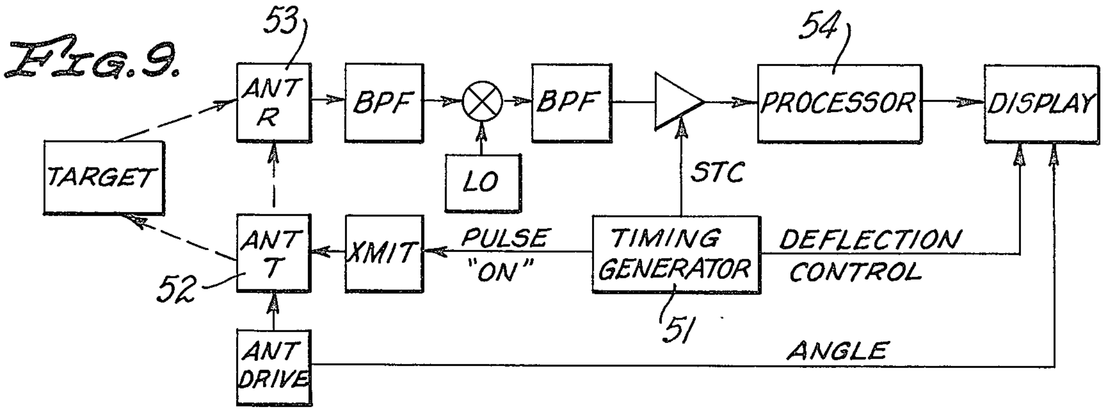
FIG. 9 is a block diagram of a pulse radar incorporating the signal processing system of the present invention.

FIG. 9 illustrates an application of the processing system to a conventional pulse radar. The transmitter pulses are regulated in time by a central timing generator 51, which also provides for sensitivity time control (STC) and display deflection control. Transmitter output (pulsed RF) is applied to a scanning antenna 52. The antenna drive also regulates the display deflection. A receiving antenna 53 having essentially identical scan and pattern characteristics to the transmitting antenna intercepts backscattered energy from targets within the field of view. The output of the receiving antenna is bandpass filtered, heterodyned to a convenient intermediate frequency, and STC-amplified. The STC regulates the IF gain such that the combined clutter and noise output is essentially constant during the interval between transmitter pulses. This output is then applied to the processor 54, and the signal enhanced processor output is then displayed.

One form of the processor 54 is shown in FIG. 10. The processor input is frequency multiplied at 56 by a factor $N_1$ such that the multiplier output amplitude is a faithful replica of the input amplitude, while the frequency of the output is $N_1$ times the input frequency. The output of the multiplier 56 is then applied to a frequency multiplexer 57 which separates the spectral output of the multiplier 56 into a set of contiguous channels, each of which has a bandwidth commensurate with the processor input bandwidth, and usually symmetrically disposed about $N_1$ times the processor input center frequency. The number of filter channels in the multiplexer and $N_1$ are chosen such that $N_1$ times the maximum desired doppler frequency is within the total multiplexed band provided, and that individual filter bandwidths divided by $N_1$ are within the desired doppler resolution limits.

Further improvement to doppler resolution may be obtained by selecting a portion of the spectral output of the frequency multiplier 56 by a bandpass filter 58 and applying this frequency range to a second stage frequency multiplier 59 and multiplexer 60. Additional stages may be used as desired. In achieving the frequency multiplications, it may be found convenient to use auxilliary heterodyne processes to avoid the need for constructing many different circuits at many different, and increasing, frequencies. Also, an auxilliary heterodyne process may be found convenient or useful to permit an expanded doppler resolution feature to be adjusted over a selected frequency range. When no heterodyne (frequency translating) processes are used in frequency multipliers 56, 59, the reference signal is fully implied by the circuit configuration. However, when herterodyne processes are employed, the local oscillator signals are derived from a locally generated source 61. In this event, the frequency reference is in part implied by circuit configuration and in part by the locally generated source.

The outputs of each channel of the multiplexer are detected, low pass filtered, and thresholded to obtain desired detection statistics (probability of detection and false alarm rate). The resultant signal may then be displayed in any conventional manner. Note that all, or any selected subset of the processor outputs may be used for display. Also, since each output has a defined doppler resolution range, a multicolor display may be used such that individual processor output are displayed with color differences. In this way, target radial velocity would be displayed as color, while range and angle are displayed as position on the display.

Operation of the processor is as follows: Desired signals are those which are stable in frequency, variable in amplitude (pulsed), and which have a carrier frequency within a selected range of possible desired doppler frequencies. For high S/N circumstances, such a signal will, after multiplication, be found to reside within one (or at most 2) of the output filters of the multiplexer, and will be detected. Signals which are slightly from maximum for a multiplier input at the same phase as the reference oscillator. The outputs of sum 1 and 2 are detected, lowpass filtered to a bandwidth commensurate with the following amplifier, applied to a differential amplifier, and the lowpass filtered output of the amplifier is then used to regulate the input phase shifter. Note that due to the use of alternate outputs from the multiplier, the outputs from sum 1 and sum 2 do not change amplitude when the multiplier input signal changes phase by 180°. Also that the bandwidth of filter 5 will tend to be much narrower than that of filters 1, 2, 3 or 4.

Figure 16:
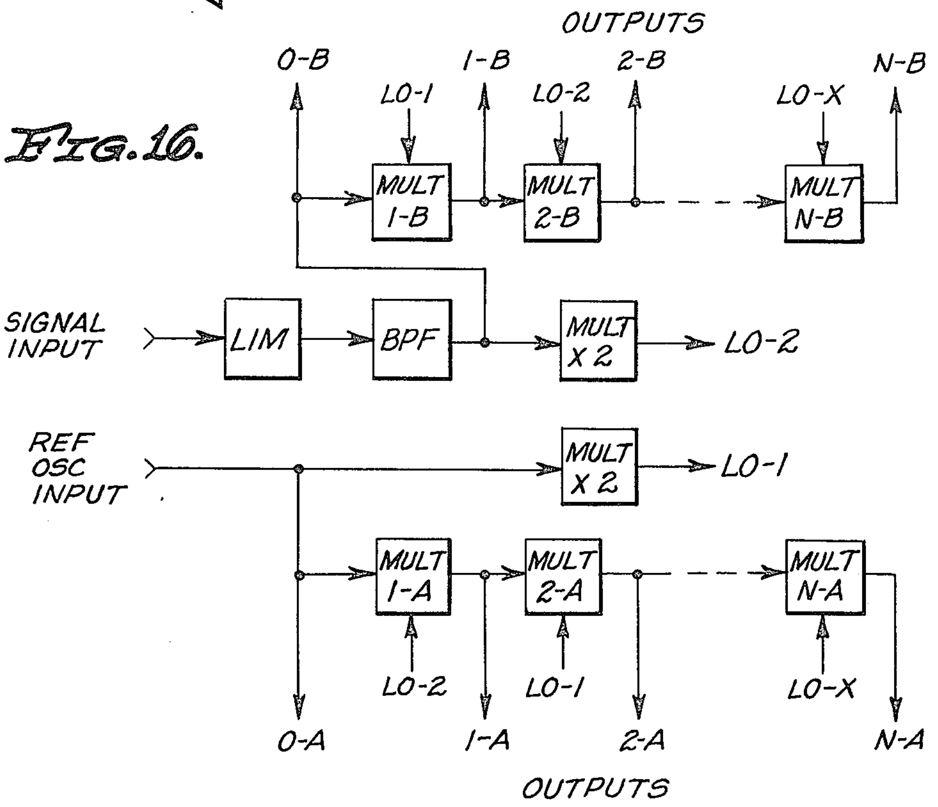
FIG. 16 is a block diagram illustrating the multiplier of FIG. 15.

The multiplier 71 is shown in more detail in FIG. 16. The input signal is amplitude limited, bandpass filtered, and frequency multiplied by a factor of 2. Note that this removes the biphase modulation, thus the output filter for this multiplier may be made relatively narrow in bandwidth. The resultant is used as a local oscillator LO-2 for certain of the frequency multiplier stages. The reference oscillator input is also multiplied by 2 and used as a local oscillator LO-1.

Figure 17:
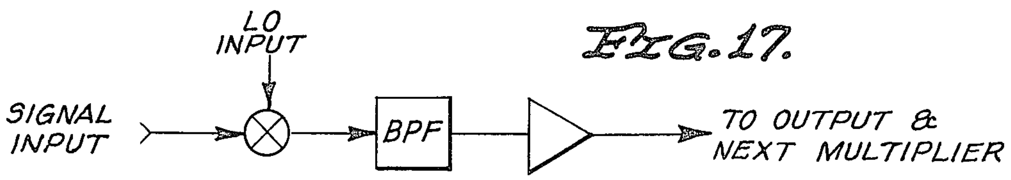
FIG. 17 is a block diagram illustrating a typical multiplier stage of FIG. 16.

The bandpass filtered output of the limiter and the reference oscillator input are applied to the first stages of a pair of cascaded frequency multiplier stages, and are also used as two of the multiplier outputs. As shown in FIG. 17, each frequency multiplier stage consists of a mixer, a bandpass filter, and an amplifier as required to restore circuit losses. The mixer used should preferably be of a type for which input signals are suppressed at the output, e.g., a doubly balanced mixer. Successive frequency multiplier stages alternate in their use of LO-1 and LO-2, while the first frequency multiplier stage for the reference oscillator input uses LO-2 and the first frequency multiplier stage for the signal input uses LO-1. The output of each multiplier stage is applied to the next multiplier stage and is also made available as a multiplied output. Output 1-A is used to phase lock the reference oscillator.

The upper cascade of frequency multiplier stages of FIG. 16 provides a set of outputs which are alternate lines of the phase spectrum represented by the totality of outputs, while the outputs from the lower cascade of frequency multiplier stages are the set of intervening lines. While either set could be used as inputs to sum 1 and sum 2 (FIG. 15), the lower set is preferred because it tends to be less influenced by input signal modulations.

Important design factors are determined as follows: The processor output is a demodulated signalling waveform of the n-phase type. Thus the number of frequency multiplier stages used must be sufficient to provide resolution of the n stages of the signalling wave form. In addition, at low S/N, the processor output is an estimate of the phase state of the input signal. This estimate may be improved by increasing the number of frequency multiplier stages used.

The processor shown in FIG. 15 is a frequency domain process. An equivalent process may be used for time domain operation, with an equivalent processor similar to that shown in FIG. 8.

Operation of the processor of FIG. 15 is as follows: The reference oscillator is regulated to the precise frequency of the input signal, and the input phase shifter regulates the signal phase to be either in or out pf phase with the reference oscillator. Each phase state of the input signal is recognized at the processor output by observing that the amplitude of the "sum" output corresponding to that phase state exceeds all others. At moderate to high S/N this amplitude difference is large. As S/N degrades, this amplitude difference decreases until at very poor S/N all outputs are very small and approximately equal.

I claim:

1. In a real time signal processing system of the cross-correlation type for selecting input signals depending upon the instantaneous degree of similarity of the input signal to a locally generated reference signal, the combination of:

first means for generating a reference signal;

second means for generating a control signal which is a real time measure of the instantaneous degree of similarity of an input signal to said reference signal;

third means for selecting said input signal as a function of said control signal, and providing the selected signal as the output;

means for connecting said input signal to said second means and to said third means; and means for connecting said reference signal to said second means.

2. A system as defined in claim 1 including means for generating a reference signal in the form of a frequency of the input signal.

3. A system as defined in claim 1 including means for generating a reference signal in the form of a phase of the input signal.

4. A system as defined in claim 1 including means for generating a reference signal in the form of a frequency and a phase of the input signal.

5. In a real time signal processing system of the cross-correlation type for selecting input signals depending upon the instantaneous degree of similarity of the input signal to a locally generated reference signal, the combination of:

means for generating a real time measure of the instantaneous degree of similarity of the input signal to said reference signal;

means for using said measure of input signal similarity such that input signals are selected in accordance with said measure of similarity;

means for connecting said input signal to said means for generating the measure of similarity and to said means for using input signals;

means for connecting said reference signal to said means for generating the measure of similarity; and means for providing selected signals as an output.

6. A real time signal processing system as defined in claim 5 wherein said reference signal represents a frequency of the input signal to be selected, and including:

a signal attenuator with the input signal connected thereto and providing an output varying in amplitude as a function of a control input thereto;

an amplitude limiter with the input signal connected thereto;

a frequency discriminator having the amplitude limiter output as an input and providing an output varying in amplitude as a function of the frequency of the input thereto;

a comparitor having the frequency discriminator output and a reference signal as inputs and providing an output varying as a function of the difference between the inputs thereto;

a low pass filter having the comparitor output as an input, and providing control output to said attenuator; and a reference signal source providing an output to said comparitor.

7. A system as defined in claim 6 wherein said comparitor output is provided as control input to said attenuator, and further including a bandpass filter having said attenuator output as an input and providing an output.

8. A system as defined in claim 6 further including:

a plurality of signal attenuators each having said input signal as input and providing an output varying in amplitude as a function of a control input thereto;

a plurality of comparitors, each having said frequency discriminator output and a reference signal as input and providing an output varying as a function of the difference between the inputs thereto;

a plurality of low pass filters, each having one of the plurality of comparitor outputs as input and providing a control output to a different one of said plurality of signal attenuators; and a reference signal source providing a plurality of outputs, one to each of said plurality of comparitors, each output being independent of all others.

9. A system as defined in claim 8 further including a detector, low pass filter and amplitude thresholding means for each output, and means for selecting one or more of said amplitude thresholded outputs for further processing or display.

10. A system as defined in claim 5 wherein said reference signal represents a phase of the input signal to be selected, and including:

a signal attenuator with the input signal connected thereto, and providing an output varying in amplitude as a function of a control input thereto;

an amplitude limiter with the input signal connected thereto;

a phase discriminator having the amplitude limiter output and a reference signal as inputs, and providing a plurality of outputs varying in amplitude as a function of the difference in phase between said limiter output and said reference signal inputs thereto;

a comparitor having the plurality of phase discriminator outputs and a reference signal as inputs, and providing an output varying as a function of the differences between the inputs thereto;

a low pass filter having the comparitor output as input, and providing a control output to said attenuator; and a reference signal source providing an output to said phase discriminator and an output to said comparitor.

11. A system as defined in claim 10 wherein said comparitor output is provided as control input to said attenuator, and further including a bandpass filter having said attenuator output as an input and providing an output.

12. A real time signal processing system as defined in claim 5 including:

means for connecting additional input signals to said means for generating, with said input signals comprising first and second components of the same frequency and varying in phase and with said reference signal being a predetermined function of the relative phase of said input signals;

a signal attenuator with one of the input signals connected thereto and providing an output varying in amplitude as a function of a control input thereto;

first and second amplitude limiters for said first and second input signal components respectively;

a 90 degree phase shifter for the output of one of said limiters;

a first phase detector for the outputs of said limiters;

a second phase detector for the output of said phase shifter and the other of said limiters; and an attenuator control circuit having the outputs of said phase detectors as inputs and providing an output to said attenuator control input varying in amplitude as a function of the amplitudes of said phase detector inputs thereto.

13. A system as defined in claim 12 further including a bandpass filter, detector, and low pass filter connected in series for the output of said attenuator.

14. A system as defined in claim 12 further including a second signal attenuator having the other of said input signals as input and providing a second output varying as a function of said attenuator control circuit output.

15. A real time signal processing system as defined in claim 5 including:

means for connecting additional input signals to said means for generating, with said input signals comprising first and second components of the same frequency and varying in phase and with said reference signal representing a relative phase of said input components to be selected;

a multiplier having said input signal components as inputs and producing a plurality of outputs, each of said outputs having essentially the same amplitude and the same frequency variations as said input signal components and a different phase, each of said phases being a fixed multiple of the instantaneous phase difference between said first and second input signal components, and said fixed multiples in combination form a well ordered sequence; and a summing unit having said plurality of multiplier outputs as input, and producing an output which is the phasor or vector sum of said plurality of multiplier outputs when combined in accordance with a fixed schedule of amplitude and phase weighting factors.

16. A system as defined in claim 15 further including a detector for the summed output and a low pass filter for the detector output.

17. A system as defined in claim 15 further including first and second limiters each having one of said input signal components as input, and providing an output to one of said inputs of said multiplier.

18. A system as defined in claim 15 wherein said summing unit combines the plurality of multiplier outputs at unchanged amplitude and phase and said multiplier includes:

first and second channels, each having one of said input signal components and the local output of the other channel as inputs and producing a local output and a plurality of other outputs;

each of said first and second channels comprising a times-2 frequency multiplier having one of said input signal components as input, and an amplitude limiter having said times-2 frequency multiplier output as input providing the local output, and a plurality of multiplier stages connected in series, the first of said multiplier stages having said input signal component and the local output of said other channel as inputs, and successive multilplier stages have first and second local outputs alternately as inputs, and said plurality of other outputs comprises said input signal component and the plurality of multiplier stage outputs; and each multiplier stage of said plurality of multiplier stages includes a mixer, a bandpass filter centered at one-half of the nominal frequency of said local outputs, and an amplifier connected in series.

19. A real time signal processing system as defined in claim 5 wherein said reference signal represents a frequency of the input signal to be selected, and including:

a frequency multiplier having the input signal and a reference signal as inputs, and producing an output varying in amplitude in essential accordance with the amplitude of said input signal, and varying in frequency as a multiple of the frequency variations of said input signal;

a bandpass filter having a bandwith commensurate with the input bandwidth of said frequency multiplier and a center frequency equal to that of a desired signal at the output of said frequency multiplier and having the frequency multiplier output as input and providing an output; and a reference signal source which provides an output to the frequency multiplier which represents the frequency of signals to be accepted.

20. A system as defined in claim 19 further including an amplitude limiter connected in front of said frequency multiplier.

21. A real time signal processing system as defined in claim 5 wherein said reference signal represents a frequency of the input signal to be selected, and including:

a frequency multiplier having the input signal and a reference signal as inputs, and producing an output varying in amplitude in essential accordance with the amplitude of said input signal, and varying in frequency as a multiple of the frequency variations of said input signal;

a frequency multiplexer providing a plurality of contiguous frequency channels each having a bandwidth at least commensurate with the bandwidth of said input signal.

22. A system as defined in claim 21 further including a detector, low pass filter and amplitude thresholding means for each output, and means for selecting one or more of said amplitude thresholded outputs for further processing or display.

23. A real time signal processing system as defined in claim 5 wherein said reference signal represents a phase of the input signal to be selected, and wherein input signal amplitude information is not preserved and said input signal is of the biphase type and said system further includes:

a phase shifter having said input signal and a control signal as inputs and providing a phase shifted output;

a multiplier unit having said phase shifter output and a reference oscillator output as inputs and providing a plurality of outputs;

each of said plurality of outputs having the same amplitude and frequency and a different phase, each of said phases being a fixed multiple of the instantaneous phase difference between said input signal and said reference oscillator, and said fixed multiples in combination form an equally spaced numeric sequence;

a reference oscillator phase locked to the frequency of said input signal by use of one of the multiplier outputs and providing an output to said multiplier unit;

first and second channels having a plurality of said multiplier unit outputs as inputs, said inputs representing alternate terms of said equally spaced numeric sequence, said first and second channels each comprising a summing unit, a detector, and a low pass filter connected in series, and said summing units having progressive phase weighting of opposite sense such that each summed output is at a moderate amplitude when said input signal and said reference signal are at equal phase and one or the other is at maximum amplitude for small departures from the equal phase condition;

a first comparitor having said first and second channel outputs as input and providing an output which varies as a function of the differences between the inputs thereto;

a low pass filter having said first comparitor output as input and providing said phase shifter control signal as output;

third and fourth channels each comprising a summing unit, detector, and low pass filter connected in series, each having all of said multiplier unit outputs as inputs, one of said summing units providing for summation of all inputs at equal phase, the other providing for summation of alternate inputs in opposing phase; and a second comparitor having third and fourth channel outputs as input and providing an output varying as a function of the difference of the inputs thereto.

24. In a real-time signal processing system of the cross-correlation type, the combination of:

a phase shifter providing a phase shifted output;

a reference oscillator providing a reference output;

first and second frequency multipliers having said phase shifted output and said reference output as inputs, respectively, and providing first and second local outputs;

a first channel having said phase shifted output as an input;

a second channel having said reference output as an input;

each of said channels comprising a cascaded multiplier having the first and second local outputs alternately as multiplier mixer inputs, providing a plurality of cascaded outputs, a summing unit for said plurality of cascaded outputs, and a detector for the summing unit outputs; and a comparator having the output of the detectors of said first and second channels as inputs and providing an output varying as a function of the relative magnitudes of the two inputs.

25. A real time signal processing system as defined in claim 24 including additional summing means having the cascaded outputs of one of said channels as inputs, and providing an output for controlling said phase shifter to shift the phase of the input thereto as a function of difference in phase of said input and the reference oscillator output.

26. In a real time signal processing system of the cross correlation type, the combination of:

a signal-to-noise processor providing an output varying as a function of the degree of similarity of the frequency of the first and second inputs thereto;

a signal attenuator having a signal input, a control input, and an output, and providing the signal input as the output varying as a function of the control input;

means for connection an input signal to said processor first input and to said attenuator as the signal input;

means for connecting to said processor second input a reference signal which represents the frequency of input signals to be accepted; and means for connecting said processor output to said attenuator control input to provide a large attenuator output when the frequency of the input signal matches the frequency represented by the reference signal and to provide a small output for other input signal frequencies.

27. A real time signal processing system as defined in claim 26 wherein said processor includes:

a frequency discriminator with the input signal connected thereto and providing an output varying in amplitude as a function of the frequency of the input thereto;

a comparitor having the discriminator output and a reference voltage as inputs and providing an output varying as a function of the difference between the inputs thereto; and a low pass filter having the comparitor output as input and providing said processor output.

28. A real time signal processing system as defined in claim 27 wherein said processor further includes an amplitude limiter between the processor signal input and the frequency discriminator.

29. In a real time signal processing system of the cross correlation type, the combination of:

a signal attenuator having a signal input, a control input, and an output, and providing the signal input as the output varying as a function of the control input;

a signal-to-noise processor providing an output varying as a function of the degree of similarity of the phases of first and second inputs thereto;

means for connecting an input signal to said processor first input and to said attenuator as the signal input;

means for connecting to said processor second input reference signals which represent the phase of input signals to be accepted; and means for connecting said processor output to said attenuator control input to provide a large attenuator output when the phase of the input signal matches the phase represented by the reference signals and to provide a small attenuator output for other input signal phase.

30. A real time signal processing system as defined in claim 29 wherein said processor includes:

an amplitude limiter with the input signal connected thereto;

a phase discriminator having the limiter output and a reference signal as inputs and providing a plurality of outputs varying as a function of the phase difference between the inputs thereto;

a comparitor having the discriminator outputs and a reference voltage as inputs and providing an output varying as a function of the differences of the voltages of the inputs thereto; and a low pass filter having the comparitor output as input and providing said processor output.

31. In a real time signal processing system of the cross correlation type for first and second input signals of the same frequency and varying in phase, the combination of:

a signal attenuator having a signal input, a control input, and an output and providing the signal input as an output varying as a function of the control input;

means for connecting one of said input signals to said attenuator signal input;

first and second limiters for said first and second input signals respectively;

a 90° phase shifter for the output of one of said limiters;

first and second phase detectors for the output of said phase shifter and the output of the other of said limiters respectively;

a comparitor having the outputs of said phase detectors and a reference voltage as inputs and providing an output varying as a function of the differences of the voltages of the inputs thereto; and a low pass filter having the comparitor output as input and providing an output to the control input of said signal attenuator.

32. In a real time signal processing system of the cross correlation type, the combination of:

a frequency multiplier providing an output varying in amplitude in accordance with the input thereto and varying in frequency as a multiple of the frequency variations of the input thereto;

a frequency multiplexer comprising a plurality of parallel connected channels each having a pass band with a different center frequency; and means for connecting an input signal to said multiplier and for connecting said multiplier and said multiplexer in series.

33. A real time signal processing system as defined in claim 32 futher including a detector and low pass filter for each of said channels of said multiplexer.

34. A real time signal processing system as defined in claim 33 further including a display unit for a detector output and means for selecting a multiplexer channel for connection to said display unit.

35. A real time signal processing system as defined in claim 32 further including an amplitude limiter between the signal input and said frequency multiplier.

36. In a real time signal processing system of the cross correlation type for first and second input signals of the same frequency, similar amplitudes, and varying in phase, the combination of:

first and second channels each having one of said input signals as input and providing a local output and a plurality of cascaded outputs; and a summing unit for the first and second cascaded outputs;

each of said channels comprising a band pass filter and a frequency multiplier for the input signal providing the local output at 2-times the input signal frequency, and a cascade of series connected frequency multiplier stages having the bandpass filter output as input and having the first and second local outputs alternately as multiplier inputs with the first multiplier having the local output of the other channel as input, and providing the plurality of cascaded outputs.

37. A real time signal processing system as defined in claim 36 wherein each frequency multiplier of said cascade of series connected frequency multipliers comprises a mixer, a bandpass filter, an amplifier providing an output to the next frequency multiplier of the cascade, and an amplitude weighting unit having the amplifier output as input and providing an output to the summing unit.

38. A real time signal processing system as defined in claim 36 wherein each of said channels further includes an amplitude limiter between the frequency multiplier and the local output.

39. A real time signal processing system as defined in claim 36 wherein each of said channels further includes an amplitude limiter between the signal input and the band pass filter.

40. A real time signal processing system as defined in claim 36 futher including a detector and low pass filter for the output of said summing unit.

* * * * *